United States Patent [19]
Tackett

[11] Patent Number: 5,477,681
[45] Date of Patent: Dec. 26, 1995

[54] DUAL CENTER-PORT MASTER CYLINDER

[75] Inventor: Wendell D. Tackett, Ann Arbor, Mich.

[73] Assignee: Kelsey-Hayes Company, Livonia, Mich.

[21] Appl. No.: 338,970

[22] Filed: Nov. 14, 1994

[51] Int. Cl.⁶ ................................................ B60T 11/20
[52] U.S. Cl. ...................................... 60/562; 60/589
[58] Field of Search ................................ 60/562, 589

[56] References Cited

U.S. PATENT DOCUMENTS

| | | | |
|---|---|---|---|
| 3,216,194 | 11/1965 | Yardley | 60/562 |
| 4,417,445 | 11/1983 | Furuta | 91/369.3 |
| 4,688,382 | 8/1987 | Farr | 60/589 |
| 5,042,254 | 8/1991 | Schonlau et al. | 60/589 |
| 5,046,316 | 9/1991 | Steffes et al. | 60/589 |

FOREIGN PATENT DOCUMENTS 796020  1/1991  U.S.S.R. ........................ 60/562

Primary Examiner—F. Daniel Lopez
Attorney, Agent, or Firm—Brooks & Kushman

[57] ABSTRACT

A dual master cylinder having a bore of uniform diameter extending through an open end thereof and slidably supporting therein a pair of tandem pistons defining a pair of pressurizing chambers. Fuel input is controlled by center-port poppet valves, and the relative disposition of inlet and outlet brake fluid passages are reversed compared to conventional master cylinders to facilitate master cylinder recession into a vacuum booster without requiring long, angled brake fluid passages and to require a shorter and lighter housing. The inlet and outlet passages are positioned so that seals do not slide over fuel passage ports during operation, eliminating seal wear caused thereby and allowing the ports to be larger, thus reducing back pressure and improving compensation when the pistons are returning to, or are in, an unstroked position.

3 Claims, 3 Drawing Sheets

DUAL CENTER-PORT MASTER CYLINDER

TECHNICAL FIELD

This invention relates generally to vehicle brake master cylinders and specifically to tandem, dual-piston type master cylinders.

BACKGROUND ART

For some time, master cylinders of the dual, tandem type have been used in automotive vehicles. Such cylinders have primary and secondary pressurizing chambers operated by respective primary and secondary pistons linearly disposed in a single main bore.

Vehicle brakes are commonly arranged in circuits, each circuit being connected to an outlet of a pressurizing chamber. A typical arrangement has front brakes operated by brake fluid from one pressurizing chamber and rear brakes operated by brake fluid from the other pressurizing chamber.

Known types of master cylinders require that the inlet, or replenishing port, of each pressurizing chamber from the master cylinder reservoir be disposed closer to the open end of the master cylinder housing than is the outlet.

Since this master cylinder has its open end recessed into a vacuum booster, no inlet connections can be readily made proximate this end. Accordingly, a long, obliquely angled, generally axially extending inlet passage may be provided in the master cylinder housing to communicate brake fluid from the reservoir to the pressurizing chamber disposed closest to the open end of the cylinder. This requires a relatively thick housing wall, adding weight and expensive machining to the system.

Such a system may also use a central control valve including a tappet slidably accommodated in a longitudinal bore of each piston and whose pedal-side end abuts a stationary bolt that extends transversely through the piston bore of the master cylinder and lifts the valve ball from its valve seat in the release position. To this end, the valve ball is held in a cage that encloses a rubber cushion or plug made of elastic material and that can be displaced in opposition to the force of a closure spring, all of which adds to the complexity and expense of the system.

Examples of such a system are shown in U.S. Pat. Nos. 4,979,426; 5,013;096; and 5,056,313. As shown in the latter of these, where the advantage of recessing the master cylinder in the vacuum booster is given up, the inlet passage of the primary piston can be located relatively near the open end of the cylinder.

A further example of the known prior art is shown in FIG. 1 of the drawing, which is a sectional representation of a typical, standard, prior art master cylinder. The master cylinder is shown including an elongate housing having a main bore. The housing also has primary and secondary inlet passages that are connected to a brake fluid reservoir.

Primary and secondary pistons are disposed within the main bore, defining a primary pressurizing chamber between the primary and secondary pistons and a secondary pressurizing chamber between the secondary piston and a closed end of the housing. The pistons are slidable between unstroked and stroked positions. Communication is maintained between the reservoir and each secondary pressurizing chamber through secondary vent ports during a compensation cycle when the pistons are returning to their unstroked position.

In operation, as the pistons begin to move toward the closed end of the housing, at least one of the seals on each of the primary and secondary pistons slide over the orifices of the primary and secondary vent ports of the standard master cylinder.

To reduce seal wear and increase seal longevity, the diameter of the primary and secondary vent ports proximate their intersection with the main bore are necessarily small compared to those of the primary and secondary inlet passages. The small orifices can result in increased back pressure, however, especially when brake fluid is cold.

While the prior apparatuses function with a certain degree of efficiency, none disclose the advantages of the improved master cylinder of the present invention as is hereinafter more fully described.

DISCLOSURE OF THE INVENTION

An object of the present invention is to provide an improved master cylinder requiring no complicated stepped bore and no long, angled passages.

Another object of the present invention is to provide a master cylinder having a greater brake fluid flow capability during a compensation cycle, when pistons are returning to, or are in, their unstroked positions, than known master cylinders.

Still another object of the present invention is to provide a master cylinder requiring fewer components and, therefore, being less expensive than known master cylinders.

Yet another object of the present invention is to provide a master cylinder requiring only two inserted subassemblies.

Another object of the present invention is to provide a master cylinder having compensated pressurizing chambers, that is, one providing direct brake fluid communication between a brake fluid reservoir and brake cylinders or an antilock braking system valve during a compensation cycle when the master cylinder pistons are returning to their unstroked positions.

An advantage of the master cylinder of the present invention is that it is shorter and lighter than known master cylinders of similar construction and function.

Another advantage of the present invention is that, due to the disposition of its inlet and outlet passages, the present master cylinder can be readily recessed into the vacuum booster, thereby reducing the overall dimensions and weight of that combination.

Still another advantage of the present invention is that, in not using complex current center-port designs, the present master cylinder is less expensive than those previously available.

A feature of the present invention is that, since seals do not slide over inlet and outlet passage ports during master cylinder operation, the seals can be expected to have a longer functional life.

In realizing the aforementioned and other objects, advantages and features, the dual center-port master cylinder of the present invention includes an elongate housing having a main axis. The housing defines therein a longitudinally disposed main bore of uniform diameter and concentrically disposed along the main axis, and it has a closed end and an open end.

A secondary inlet passage, which is connectable to a brake fluid reservoir, extends obliquely into the main bore at the closed end of the housing. A secondary outlet passage intersects the main bore proximate the closed end and at substantially right angles to the main axis and to the secondary inlet passage.

The housing also has therein a primary inlet passage, which is also connectable to a brake fluid reservoir and which intersects the main bore at substantially right angles at a location farther from the closed end of the housing than the secondary outlet passage. A primary outlet passage intersects the main bore at substantially right angles at a location farther from the closed end of the housing than the primary inlet passage.

A secondary piston, having a leading end and a trailing end, is disposed within the main bore and cooperates with the closed end of the housing to define a secondary pressurizing chamber therebetween. The secondary piston is slidable between unstroked and stroked positions that respectively define maximum and minimum secondary pressurizing chamber volumes. The secondary piston sealably isolates the secondary inlet and outlet passages from the primary inlet and outlet passages, the primary outlet passage being disposed proximate the trailing end of the secondary piston when the latter is in its unstroked position. Communication is maintained between the secondary inlet and outlet passages during a compensation cycle when the secondary piston is returning to, or is in, its unstroked position.

A primary piston is disposed within the main bore and cooperates with the secondary piston to define a primary pressurizing chamber therebetween. The primary piston is slidable between unstroked and stroked positions that respectively define maximum and minimum primary pressurizing chamber volumes. The primary piston sealably isolates the primary inlet and outlet passages from the open end of the housing. Communication is maintained between the primary inlet and outlet passages during a compensation cycle when the primary piston is returning to, or is in, its unstroked position.

The objects, advantages and features of the present invention are readily apparent from the following detailed description of the best mode for carrying out the invention when taken in connection with the accompanying drawings.

BRIEF DESCRIPTION OF THE DRAWING(S)

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
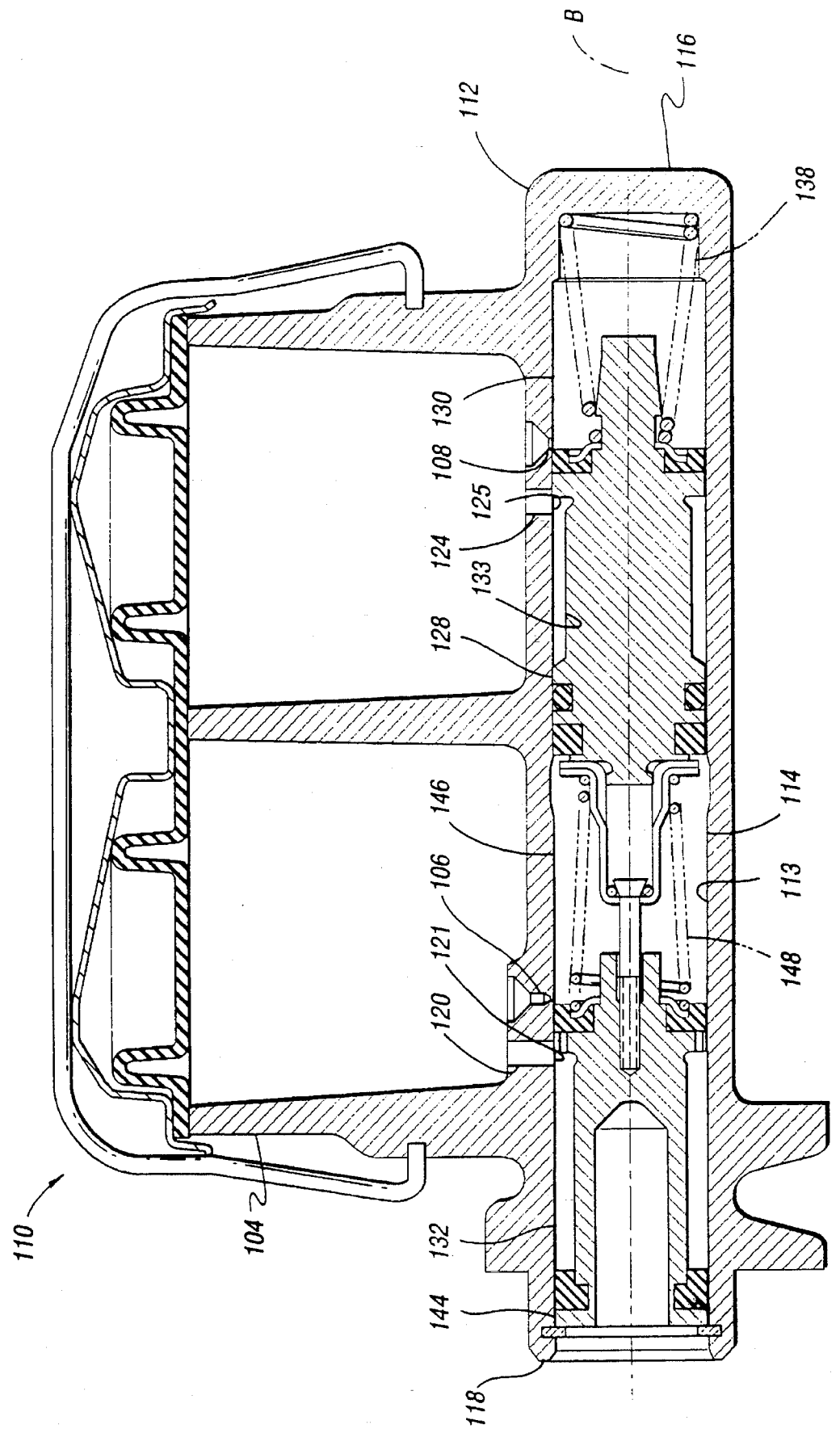
FIG. 1 is a sectional representation of a standard, prior art master cylinder and illustrates the relative sizes of standard vent and replenishing brake fluid ports.
Figure 2:
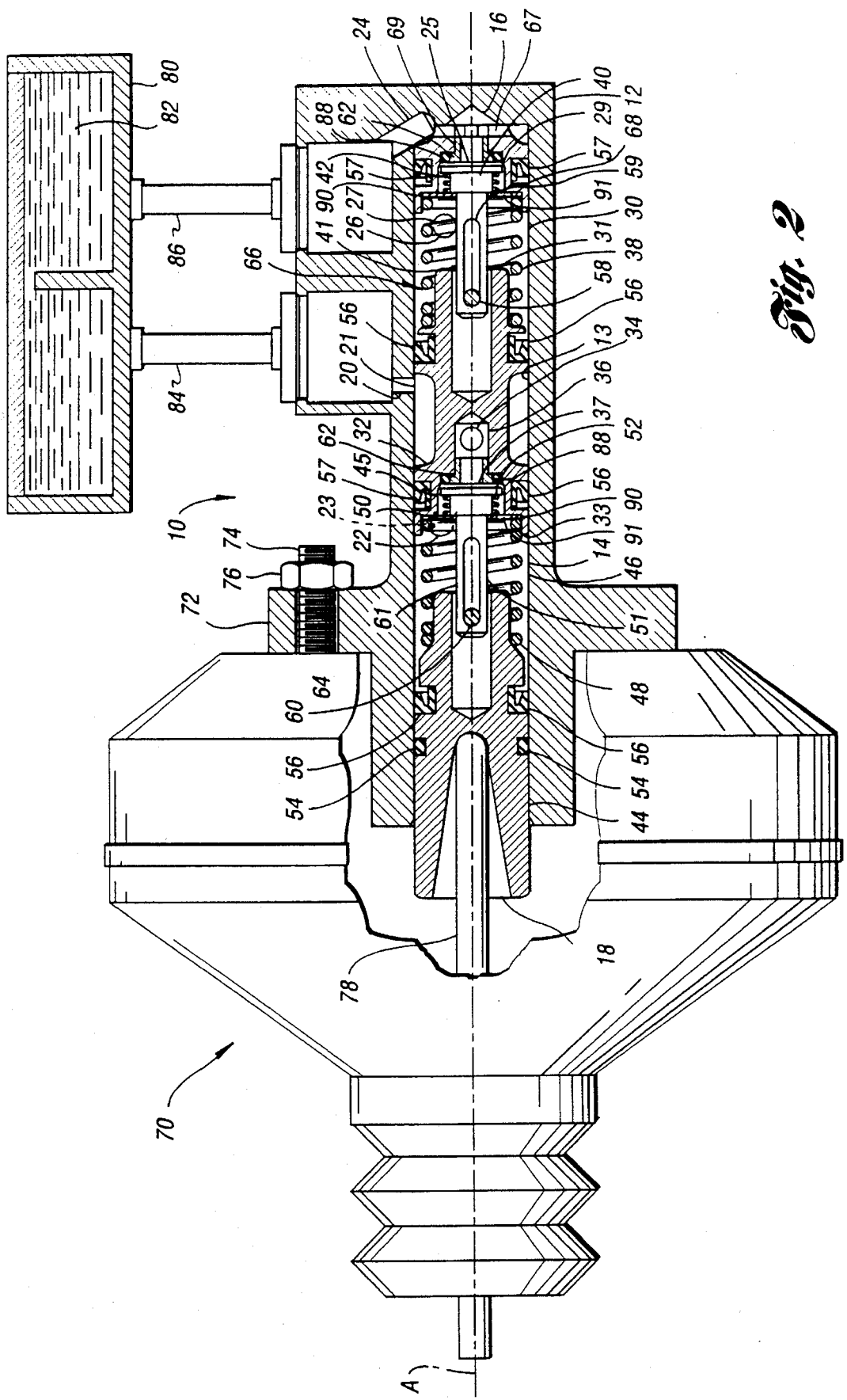
FIG. 2 is a sectional view of the master cylinder of the present invention, shown with pistons in their respective unstroked positions and shown in combination with a vacuum booster, the view also depicting connections to a brake fluid reservoir, which is shown partially broken away.

FIG. 2 of the drawing is a sectional representation of a preferred embodiment of a dual center-port master cylinder, generally indicated by reference numeral 10. The master cylinder 10 is shown to include an elongate housing 12 having a main axis A—A extending longitudinally therethrough. A main bore 14 having a uniform diameter is concentrically disposed along the main axis A—A within the housing 12. The housing 12 has a closed end 16 at one end of the main bore 14 and an open end 18 at the other end of the main bore 14.

The housing 12 also has therein a primary inlet passage 20. It is connectable to a brake fluid reservoir 80 via a primary inlet brake fluid line 84. The primary inlet passage 20 intersects the main bore 14 at substantially right angles to the main axis A—A, forming a primary inlet passage port 21. A primary outlet passage 22 intersects the main bore 14 at substantially right angles both to the main axis A—A and to the primary inlet passage 20, forming a primary outlet passage port 23. The primary outlet passage 22 is connectable to brake cylinders or to an antilock braking system valve (neither being shown).

A secondary inlet passage 24 extends obliquely into the main bore 14 at the closed end 16 of the housing 12. The secondary inlet passage is connectable to a brake fluid reservoir 80 via a secondary inlet brake fluid line 86. A secondary outlet passage 26 intersects the main bore 14 proximate the closed end 16 and at substantially right angles to the main axis A—A, forming a secondary outlet passage port 27. The secondary outlet passage 26 is similarly connectable to brake cylinders or to an antilock braking system valve (neither being shown).

A secondary piston 28, having a leading end 31 and a trailing end 33, is disposed within the main bore 14 and defines a secondary pressurizing chamber 30 between the secondary piston 28 and the closed end 16 of the housing 12. The secondary piston 28 is slidable between unstroked and stroked positions (FIGS. 2 and 3 respectively) that define maximum and minimum secondary pressurizing chamber volumes respectively. A secondary piston spring 38 resiliently biases the secondary piston 28 away from the closed end 16 of the housing 12.

The secondary piston 28 is fitted with a pair of seals 56 and 57, typically V-block, or lip, seals or their equivalent, disposed in annular recesses therein, the lip seal 56 having a higher pressure differential than the lip seal 57. The secondary piston 28 sealably isolates the secondary inlet and outlet passages, 24 and 26 respectively, from the primary inlet and outlet passages, 20 and 22, the primary outlet passage being disposed proximate the trailing end of the secondary piston when the latter is in its unstroked position Medially defined within the secondary piston 28 is a peripheral recess cooperating with the main bore 14 to form an annular gallery 32. The annular gallery 32 has a sufficient longitudinal dimension to provide continuous communication with the primary inlet passage 20 at all positions of the secondary piston 28. Also defined within the secondary piston 28 is a lateral interior passage 34, in communication with the annular gallery 32.

A longitudinal interior passage 36 extends between the lateral interior passage 34 and the trailing end of the secondary piston. Communication is maintained by these passages between the primary inlet and outlet passages, 20 and 22 respectively, when the secondary piston 28 is in its unstroked position.

Figure 3:
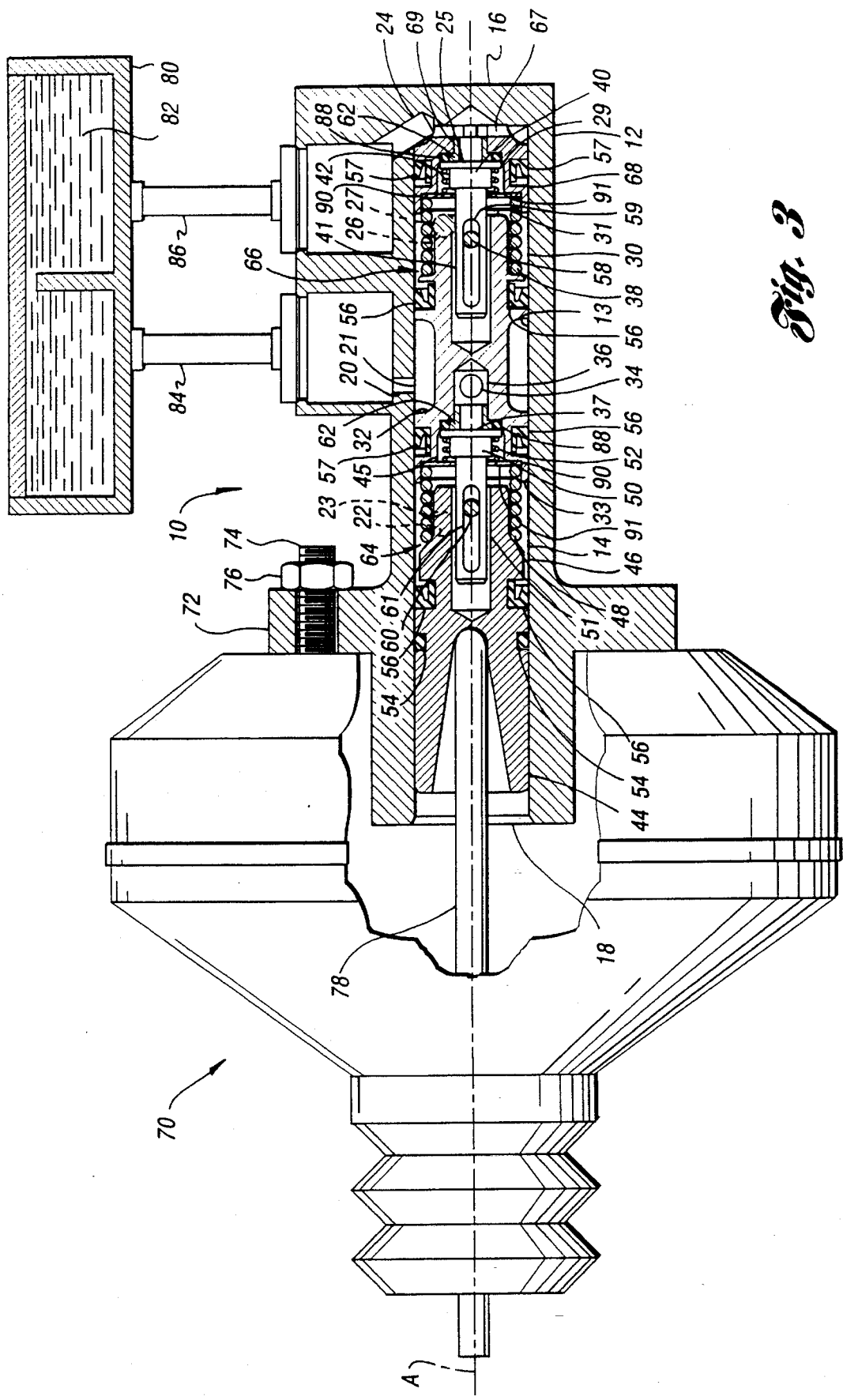
FIG. 3 is a sectional view of the master cylinder of FIG. 2, shown with pistons in their stroked positions.

A secondary inlet, or popper, valve 40 is slidably supported by the secondary piston 28 and is reciprocatable along the main axis A—A between an extended and a retracted position (FIGS. 2 and 3 respectively). The Secondary inlet valve 40 has a stem 41 defining therein a secondary inlet valve retaining pin slot 59. The reciprocating movement of the secondary inlet valve 40 is limited by a secondary inlet valve retaining pin 58 secured to the housing 12 and disposed in the secondary inlet valve retaining pin slot A retainer piece 68 is disposed within the main bore 14, proximate the closed end 16 of the housing 12. The retainer piece 68 defines therein a recess 29 and an axially coextensive longitudinal passage 69 into which is pressed a valve seat insert 62, which defines a secondary inlet port 25 therein. The valve seat insert 62 has a flanked portion that resides within the retainer piece recess 29. An O-ring seal 88 is seated within the counterbore, surrounding, and proud of, the flanged portion of the valve seat insert 62. The retainer piece 68 has integral, spaced posts 67 projecting therefrom to contact the closed end 16 of the housing 12.

When in its retracted position (FIG. 2), the secondary inlet valve 40 is disposed proximate to, but spaced from, the valve seat insert 62. When in its extended position (FIG. 3), the secondary inlet valve 40 is resiliently biased against the valve seat insert 62 by a secondary inlet valve spring 42, which is disposed in the recess 29 defined within a retainer piece 68, the O-ring seal 88 providing a fluid-tight seal between the secondary inlet valve 40 and the valve seat insert 62.

A perforate disk 90, defining therein one or more flow passages 91, is also received within the retainer piece 68 to provide a stop for the secondary piston spring 38. It should be noted that clearance is provided between the periphery of the secondary piston inlet valve 40 and the retainer piece 68. When the secondary inlet valve 40 is in its retracted position, this clearance allows fluid to flow from the secondary inlet passage 24, between the retainer piece posts 67, through the valve seat insert 62, through the secondary inlet passage port 25, around the secondary inlet valve 40, through the perforate disk 90 and into the secondary pressurizing chamber 30.

The trailing end of the secondary piston 28 is constructed similarly to the retainer piece 68 and includes a valve seat insert 62 pressed into the longitudinal interior passage 36, an O-ring seal 88, and a perforate disk 90 having at least one flow passage 91. The perforate disk 90 provides a stop for the primary piston spring 48. When the primary inlet valve 50 is in its retracted position, fluid is allowed to flow from the primary inlet passage 20, through the primary inlet passage port 21, through the valve seat insert 62, around the primary inlet valve 50, through the perforate disk 90 and into the primary pressurizing chamber 46.

A primary piston 44 is disposed within the main bore 14 and cooperates with the secondary piston 28 to define a primary pressurizing chamber 46 therebetween. The primary piston 44 is slidable between unstroked and stroked positions that respectively define maximum and minimum primary pressurizing chamber volumes. A primary piston spring 48 resiliently biases the primary piston 44 away from the secondary piston 28.

Fitted in respective annular recesses therein, the primary piston 44 has a seal 54, typically an O-ring, and a lip seal 56, typically the same lip seal 56 as used on the secondary piston 28. The primary piston 44 sealably isolates the primary inlet and outlet passages, 20 and 22 respectively, from the open end 18 of the housing 12. Communication is maintained between the primary inlet and outlet passages, 20 and 22 respectively, during a compensation cycle when the primary piston 44 is returning to, or is in, its unstroked position.

A primary inlet, or popper, valve 50 is slidably supported by the primary piston 44 and is reciprocatable along the main axis A—A between a retracted and an extended position (FIGS. 2 and 3 respectively). The primary inlet valve 50 has a stem 51 defining therein a primary inlet valve retaining pin slot 61. The reciprocating movement of the primary inlet valve 50 is limited by a primary inlet valve retaining pin 60 secured to the housing 12 and disposed in the primary inlet valve retaining pin slot 61.

When in its retracted position (FIG. 2), the primary inlet valve 50 is disposed proximate to, but spaced from, the valve seat insert 62, which defines a longitudinal interior passage port 37 therein. When in its extended position (FIG. 3), the primary inlet valve 50 is resiliently biased against the valve seat insert 62 by a primary inlet valve spring 52, which is disposed in a recess 45 defined within the trailing end of the secondary piston 28 in a manner as described for the retaining piece 68, the O-ring seal 88 providing a fluid-tight seal between the primary inlet valve 50 and the valve seat insert 62.

The apparatus disposed within the main bore 14 of the housing 12 essentially includes primary and secondary master cylinder subassemblies, 64 and 66 respectively. The primary master cylinder subassembly 64 includes the primary piston 44, the primary piston spring 48, the primary inlet valve 50, the primary inlet valve spring 52 and the primary inlet valve retaining pin 60. The secondary master cylinder subassembly 66 includes the secondary piston 28, the secondary piston spring 38, the secondary inlet valve 40, the secondary inlet valve spring 42 and the secondary inlet valve retaining pin 58.

The housing 12 of the master cylinder 10 is affixed to a vacuum booster 70 by well-known means such as a bolt, or stud, 74 passing from the vacuum booster 70 through a flange 72 on the housing 12 and being secured by a nut 76. The master cylinder 10 is actuated when an output power member, or push rod, 78 exerts force on the primary piston 44.

In operation, as a force is applied to the primary piston 44 and is transmitted through the primary piston spring 48 to the secondary piston 28, both pistons and both the primary and secondary inlet valves, 50 and 40 respectively, begin to translate toward the closed end 16 of the housing 12. Translation of the secondary inlet valve 40 is halted when it sealingly encounters the valve seat insert 62 formed at the secondary inlet passage port 25, and the secondary inlet valve spring 42 compresses as the secondary piston 28 continues toward its stroked position.

Similarly, translation of the primary inlet valve 50 is halted when it sealingly encounters the valve seat insert 62 formed at the longitudinal interior passage port 37, and the primary inlet valve spring 52 compresses as the primary piston 44 continues toward its stroked position. The primary and secondary piston springs, 48 and 38 respectively, compress until these pistons have reached their respective stroked positions.

With the primary and secondary inlet passages, 20 and 24 respectively, to the reservoir 80 closed, pressure in the primary and secondary pressurizing chambers, 46 and 30 respectively, increases, pressurizing brake fluid in these chambers and in brake fluid lines connecting the primary and secondary outlet passages, 22 and 26 respectively, to brake cylinders or to an antilock braking system valve (neither being shown).

When force is removed from the primary piston 44, it and the secondary piston 28 are translated to their respective unstroked positions under the influence of the residual brake fluid pressure in the primary and secondary pressurizing chambers, 46 and 30 respectively, and the influence of the primary and secondary piston springs, 48 and 38 respectively.

In the master cylinder 10 of the present invention, the relative positions of the primary inlet and outlet passages, 20 and 22 respectively, have been reversed from those of known designs. The relative positions of the secondary inlet and outlet passages, 24 and 26 respectively, have also been reversed. The primary inlet passage 20 has been positioned proximate the midpoint of the secondary piston 28, closer to the closed end 16 of the housing 12 than to the open end 18 thereof.

As a result, the primary piston 44 does not need as many seals and need not be as long to provide compensation, that is, communication between the reservoir 80 and the primary pressurizing chamber 46. This, in turn, means that the master cylinder also need not be as long, therefore saving space, weight and expense. Recessing the master cylinder into an associated vacuum booster 70, as shown by FIG. 2, is facilitated since that portion of the housing 12 proximate the open end 18 thereof is free of brake fluid passage connections.

This configuration also eliminates the requirement for long, angled inlet passages and eliminates the requirement for a complicated stepped bore and cross pins. It thereby decreases the complexity and cost of the master cylinder. Furthermore, since seals do not slide over inlet ports, the former can be expected to provide a longer functional life; and the latter can be of increased diameter, thereby reducing back pressure and improving the response of an associated traction control system. Also, since this configuration uses poppet valves for the primary and secondary inlet valves, 50 and 40 respectively, expenses associated with more complex and costly valves such as those comprising valve balls, cages, springs and the like are eliminated.

While the best mode for carrying out the invention has been described in detail, those familiar with the art to which this invention relates will recognize various alternative designs and embodiments for practicing the invention as defined by the following claims.

What is claimed is:

1. A dual center-port master cylinder comprising:

an elongate housing having a main axis and an inner surface defining therein a longitudinally disposed main bore having a uniform diameter and being concentrically disposed along the main axis, the housing having a closed end and an open end, the housing also defining therein a secondary inlet passage extending through the closed end and intersecting the main bore, a secondary outlet passage intersecting the main bore proximate the closed end, a primary inlet passage intersecting the main bore at a location farther from the closed end than the secondary outlet passage, and a primary outlet passage intersecting the main bore at a location farther from the closed end than the primary inlet passage;

a secondary piston, having a leading end and a trailing end, disposed within the main bore, the leading end cooperating with the closed end of the housing to define a secondary pressurizing chamber therebetween, the secondary piston being resiliently biased away from the closed end of the housing and being slidable between an unstroked and a stroked position, the secondary piston sealably isolating the secondary inlet and outlet passages from the primary inlet and outlet passages, the secondary piston defining a peripheral recess cooperating with the inner surface of the housing to define an annular gallery having a sufficient longitudinal dimension to provide continuous communication with the primary inlet passage, the secondary piston further defining therein interior passages providing communication between the primary inlet passage and the trailing end of the secondary piston, communication being maintained between the secondary inlet and outlet passages during a compensation cycle when the secondary piston is returning to, or is in, its unstroked position, the primary outlet passage being disposed proximate the trailing end of the secondary piston when the latter is in its unstroked position;

secondary inlet valve means mounted on the secondary piston for resilient translation therewith to seal the secondary inlet passage when the secondary piston is in its stroked position;

a primary piston disposed within the main bore and cooperating with the secondary piston to define a primary pressurizing chamber therebetween, the primary piston being resiliently biased away from the secondary piston and being slidable between an unstroked and a stroked position, the primary piston sealably isolating the primary inlet and outlet passages from the open end of the housing, communication being maintained between the primary inlet and outlet passages during a compensation cycle when the primary piston is returning to, or is in, its unstroked position;

the primary and secondary pistons each carrying at least one annular seal member interfacing the inner surface of the main bore;

primary inlet valve means mounted on the primary piston for resilient translation therewith to seal the primary inlet passage when the primary piston is in its stroked position;

the primary piston and the primary inlet valve means forming a primary master cylinder subassembly and the secondary piston and the secondary inlet valve means forming a secondary master cylinder subassembly;

brake fluid being forced from the primary and secondary pressurizing chambers, through the respective primary and secondary outlet passages, as the respective primary and secondary pistons are forced from their unstroked to their stroked positions against the resilient biases;

the interior passages of the secondary piston including (i) a lateral interior passage in communication with the annular gallery, and (ii) a longitudinal interior passage providing communication between the lateral interior passage and the trailing end of the secondary piston, communication being maintained between the secondary inlet and outlet passages during a compensation cycle when the secondary piston is returning to, or is in, its unstroked position;

the lateral and longitudinal interior passages enabling the primary inlet passage and the primary and secondary outlet passages to be disposed such that the sealing members used to interface the primary and secondary pistons and the inner surface of the main bore do not slide over the passages during master cylinder operation;

the trailing end of the secondary piston being counterbored at the lateral interior passage, an O-ring valve seal assembly being retained within the counterbore, said O-ring valve seal assembly including a valve seat insert pressed into the longitudinal interior passage of the secondary piston and an O-ring seal, the O-ring seal being retained within the counterbore by the valve seat insert and longitudinally projecting beyond the valve insert to be held proud thereof, thereby providing a valve seat insert sealing surface;

the primary inlet valve means including a primary inlet popper valve supported by the primary piston and being slidable along the main axis between a retracted and an extended position, and a primary inlet valve spring resiliently maintaining the primary inlet popper valve in its extended position and resiliently biasing the primary inlet poppet valve toward the primary inlet passage, the primary inlet poppet valve being resiliently forced sealingly into engagement with the O-ring seal, and against the sealing surface of the valve seat insert, by the primary inlet valve spring when the primary piston is resiliently forced from its unstroked position toward its stroked position.

2. The dual center-port master cylinder as defined by claim 1, wherein the secondary inlet valve means comprises:

a secondary inlet popper valve supported by the secondary piston and being slidable along the main axis between a retracted and an extended position; and a secondary inlet valve spring resiliently maintaining the secondary inlet poppet valve in its extended position and resiliently biasing the secondary inlet popper valve toward the secondary inlet passage, the secondary inlet poppet valve being resiliently force sealingly against the secondary inlet passage by the secondary inlet valve spring when the secondary piston is resiliently forced from its unstroked position toward its stroked position.

3. The dual center-port master cylinder as defined by claim 1, further including:

a vacuum booster having a power output member and having defined therein a recess, a portion of the housing including the open end thereof being mountably disposed in the vacuum booster recess such that the power output member is positioned to force the primary piston from its unstroked position toward its stroked position.

* * * * *

UNITED STATES PATENT AND TRADEMARK OFFICE
CERTIFICATE OF CORRECTION

PATENT NO. : 5,477,681
DATED : December 26, 1995
INVENTOR(S) : Wendell D. Tackett It is certified that error appears in the above-indentified patent and that said Letters Patent is hereby corrected as shown below:

On the title page, item [56],

Foreign Patent Documents, After "796020", Delete "1/1991" and insert therefor --1/1981--.

Column 3, Line 3  After "right" delete "," (comma).

Column 4, Line 60  Delete "popper" and insert therefor --poppet--.

Column 4, Line 63  Delete "Secondary" and insert therefor --secondary--.

Column 5, line 2  After "slot" insert --59--.

Column 5, line 8  Delete "flanked" and insert therefor --flanged--.

Column 5, line 62 Delete "popper" and insert therefor --poppet--.

Column 9, line 4  Delete "popper" and insert therefor --poppet--.

Column 9, line 7 Delete "popper" and insert therefor --poppet--.

Column 9, line 18 Delete "popper" and insert therefor --poppet--.

UNITED STATES PATENT AND TRADEMARK OFFICE
CERTIFICATE OF CORRECTION

PATENT NO. : 5,477,681
DATED : December 26, 1995
INVENTOR(S) : Wendell D. Tackett It is certified that error appears in the above-indentified patent and that said Letters Patent is hereby corrected as shown below:

```
Column 10, line 3
Delete "popper" and insert therefor --poppet--.

Column 10, line 11
Delete "1" and insert therefor --2--.
```

Signed and Sealed this

Sixteenth Day of July, 1996

Attest:

BRUCE LEHMAN

Attesting Officer     Commissioner of Patents and Trademarks